March 5, 1957 V. L. COLLINS 2,783,998

CARD GAMES

Filed Sept. 16, 1954 2 Sheets-Sheet 1

INVENTOR.
VERNON L. COLLINS
BY
Reynolds, Beach & Christensen
ATTORNEYS

March 5, 1957 V. L. COLLINS 2,783,998

CARD GAMES

Filed Sept. 16, 1954 2 Sheets-Sheet 2

INVENTOR.
VERNON L. COLLINS
BY
Reynolds, Beach & Christensen
ATTORNEYS

United States Patent Office 2,783,998
Patented Mar. 5, 1957

2,783,998
CARD GAMES

Vernon L. Collins, Colville, Wash.

Application September 16, 1954, Serial No. 456,578
5 Claims. (Cl. 273—152.7)

This invention relates to improvements in card games and more particularly concerns a novel type of playing card and deck of such playing cards by which an interesting and instructive vocabulary game may be played involving the formation of words competitively according to the novel rules and principles of play as hereinafter described. The invention is herein illustratively described by reference to its presently preferred form and manner of use; however, it will be recognized that certain modifications and changes therein with respect to details may be made without departing from the essential features of the invention.

Games in which the players compete to form words from letter elements drawn by or dealt to them are both educational and entertaining. In the commonly known games of that type the individual letter elements contain a single letter, and the elements are played either in single sequences or in crossword patterns depending upon the particular game. Some of these games have required grid-lined playing boards and letter blocks of relatively small size to permit large numbers of the blocks to be laid out serially and in different word patterns on a board of convenient size. Other proposals involved the use of decks of playing cards bearing indicia letters of the alphabet and adapted to be spread out on a table top in serial arrangements to make up different words. However, in order to be conveniently shuffled, dealt and handled, such playing cards were required to be of approximately conventional playing card size, which immediately gave rise to a space problem. The difficulty when a number of players participated in the game was that most conventional card tables were not large enough to provide space for all of the word "books" made up in the progress of play since a long word formed by large size cards laid edge to edge would extend across most of the width or breadth of conventional size card tables.

A general object of the present invention is to provide a novel and intriguing word game in which the game pieces are in the form of playing cards so constituted with respect to the indicia letters appearing on the individual cards that the cards may be of standard size or nearly so and yet are designed so that they may be successively overlapped in such manner as to occupy relatively little space when formed into words on a card table.

A further object is to provide vocabulary game cards not only permitting the playing of a large number of cards on a relatively small table area but designed to afford a large degree of versatility in respect to the different ways in which a limited number of cards may be used in making up words and in respect to the possibilities of employing more interesting methods of keeping score.

The individual cards of the novel card game bear two card alphabetical letters or letter-groups, usually a vowel and a consonant, but in some cases a group of two letters such as QU, which occur together in common usage, and a third letter. Such letters or letter-groups are referred to generally herein as "indicia letters." The deck of cards is so constituted with respect to the total number of appearances of the individual letters and letter-groups, and to the combinations of letters on the different cards, that with the limited number of cards available a relatively large number of words may be made up according to the normal usages of the particular language in which the vocabulary game is to be played. In other words the deck of cards is a "matched deck" connoting that the number of occurrences of any individual letter relative to those of other letters is approximately in the same ratio as the relative number of occurrences of such letters as they are used in words involved in common usage of the language.

In accordance with an important feature of the invention, the individual card letters appear in one closely spaced serial reading arrangement at one end of the card and in the reverse serial arrangement at the opposite end thereof with the card inverted. As a more specific feature, the two appearances of the two letters or letter-groups on each card are placed in the upper left-hand corner and in the lower right-hand corner, respectively, so that several cards may be held in the hand and viewed in the usual manner of holding and viewing conventional playing cards, wherein for reasons of compactness the cards are arranged to overlap in fan-like fashion. Likewise, such cards with the described card letter arrangement may be spread out compactly on a table surface to make up different words wherein one or both of the letters or letter-groups at one end of the card may be used, depending upon whether the next overlying card making up the word book covers the second letter or letter-groups or permits such letter or letter-groups to be exposed, and become a part of the sequence of letters in the word. In any event, only a small end portion of each card, except the last card of the word book, is required to be exposed, and as a result even the longest of words require very little space on the table top.

Another feature of the invention is the provision on the individual cards of a suitable means designating one end of the card as the nominal top, and the placement of the most frequently occurring (according to common usage) letter sequence of the two letters on that card located at the very top for the convenience and information of the player in sorting the cards and arranging them in the hand. In addition, in the two remaining corners of the preferably rectangular card the individual card letters respectively appear separately for convenience in establishing end letters in the word books played. Thus in the upper right-hand corner of a card will appear the first letter of the most frequently occurrent (in terms of common usage) letter or letter-group sequence of that card, whereas in the lower left-hand corner will appear the other letter or letter-group, and when the card is played to end a word and only one of the card letters is used in the word termination, the card may be offset relative to the other cards making up the book so that the correct single letter is aligned with the other readably arranged letters of the word, and the player thereby indicates that the word has been terminated for scoring purposes. Preferably these individually placed card letters appearing in the upper right-hand and lower left-hand corners of the card are oriented differently than the serially arranged letters in the upper left-hand and lower right-hand corners so that when a single letter of the card is used in making a word ending, the card is oriented differently than the other cards in the word book.

These and other features, objects and advantages of the invention will become more fully evident from the following description thereof by reference to the accompanying drawings.

Figure 1:
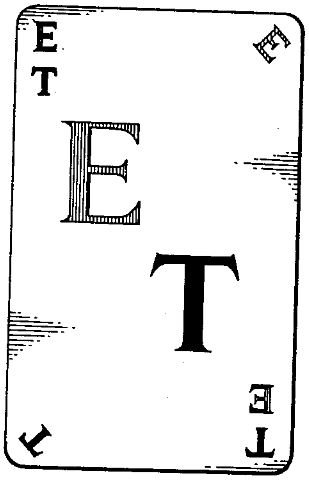
Figure 1 is a face view of a typical card embodying the invention.
Figure 2:
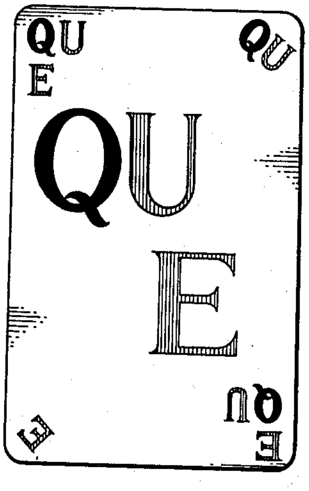
Figure 2 is a face view of another typical card embodying the invention, wherein one of the two indicia letters appearing on the card comprises a pair of letters.

The interesting and educational vocabulary game to be described hereinafter is made possible by the novel playing cards as illustrated in the drawings. Referring particularly to Figures 1 and 2, it will be noted that each card bears two indicia letters. In Figure 1 the letters E and T appear, whereas in Figure 2 the indicia letters QU and E appear. Each card preferably has a nominal top and bottom as indicated by any suitable device such as the placement of the two indicia letters in large size as decor in the central portion of the card so that both letters are in readable position with the nominal top of the card at the top. The reason for indicating the nominal top and bottom of each card is for the convenience and information of the player, since one feature of the card is the arrangement of its two indicia letters in their most commonly occurrent readable sequence in the nominally upper left-hand corner of the card and the less frequently occurrent readable sequence of the same letters, as viewed with the card inverted, in the nominally lower high-hand corner of said card. Thus with particular reference to Figure 1 the E is placed above the T in the upper left-hand corner of the card and the T is placed above the E (with the card inverted for reading purposes) in the lower right-hand corner thereof. This indicates that the sequence ET is more frequently occurrent in common usage than the sequence TE. Knowing this fact, the player is afforded a better chance of conceiving word books to be played when he arranges the cards in his hand with the nominal tops of the cards at the top of the hand.

In the third and fourth corners of the card the individual card indicia letters appear separately. In the upper right-hand corner of the card shown in Figure 1 the E appears, whereas in the lower left-hand corner the letter T appears. Preferably these separately appearing indicia letters constitute the first indicia letter of the grouping occurring at the same end of the card. These separately appearing indicia letters are preferably oriented differently with respect to readibility than the group of indicia letters appearing at the same end of the card, respectively. In the example the E and the T are aligned approximately with the diagonal of the generally rectangular card, and in order to place either of these letters at an orientation for correct readability, the card must be inclined relative to any card the indicia letters of which are to be matched up with the separately appearing indicia letter used on the first-mentioned card. Such separately appearing indicia letters, as later explained more fully, are used only for word endings, and the advantage of having a different orientation for these separately appearing letters is that the card must be differently oriented from the other cards in the word book, thereby to indicate that a particular word has been terminated by the differently oriented card.

Figure 3:
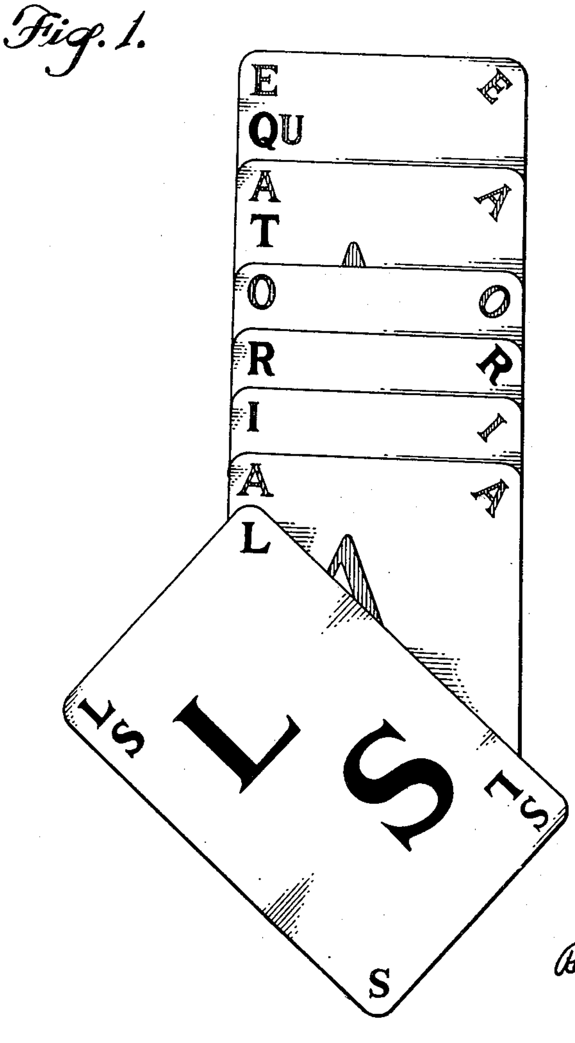
Figure 3 is a face view illustrating the manner of booking cards to form a word, in which the terminal letter of the word book comprises but one of the card letters of the last card in the sequence.

This latter aspect is illustrated more fully in Figure 3 wherein a word book is shown, making up the word "equatorial." In making up this word the card bearing the two indicia letters QU and E is placed first on the table surface, both indicia letters being used in the word combination. The next card bearing the indicia letters A and T is superimposed on the first-mentioned card so as to cover all portions of the card except the end portion bearing the two indicia letters thereof to be used in the word. The third card bearing the letter O is placed on the second so that the two indicia letters A and T of the second card still show, whereas the fourth card is placed on the third so that only the O is exposed and the second indicia letter of the card bearing the O is covered up. The last card is that bearing the indicia letters L and S; however, since only the L is to be used in making up the word, the card is oriented so that the separately appearing letter L in the norminally upper right-hand corner of such card is located directly beneath the letter A of the next-to-last card in the book. The L card is placed so that the companion indicia letter of the letter A on the A card is covered up. The inclination of the L card relative to the other serially arranged cards in the word book indicates that the L card terminates the word and that only a single letter on such card is used, as a convenience in scoring at the end of the hand.

It will be apparent from the manner in which the word books are made up as shown in Figure 3 that the cards may be of relatively large (preferably standard playing card) size and yet long words may be formed without occupying very much space on a card table. Moreover, the alternatives of using each individual card in different ways to form words makes for greater versatility in the play with a limited number of cards. Thus, each card may be used in either of four ways, since it is possible to use either the first letter or both letters of the sequence at each end of an individual card in relatively inverted positions.

In order better to understand the advantages of the novel arrangement of indicia letters on the word game cards, the preferred rules and principles of play of the novel word game will now be described.

In general, the objective of the game is, of course, to become proficient at making up word books from cards dealt to and drawn by each player, and more particularly of making up those words books which will yield the greatest score from the cards in the hand. The scoring system employed in the game places heavier emphasis on longer words than short ones (i. e. the score for a word is proportional to the square of the number of letters). As will be explained in more detail below, the player is privileged to compile "optional" words and a "contract" word in the course of each game. By mutual agreement among the players certain types of words such as hyphenated words or slang words may be admitted or rejected. Ordinarily it is preferred to adopt the text of a standard dictionary as the ultimate guide as to the propriety of including or excluding particular words.

Figure 4:
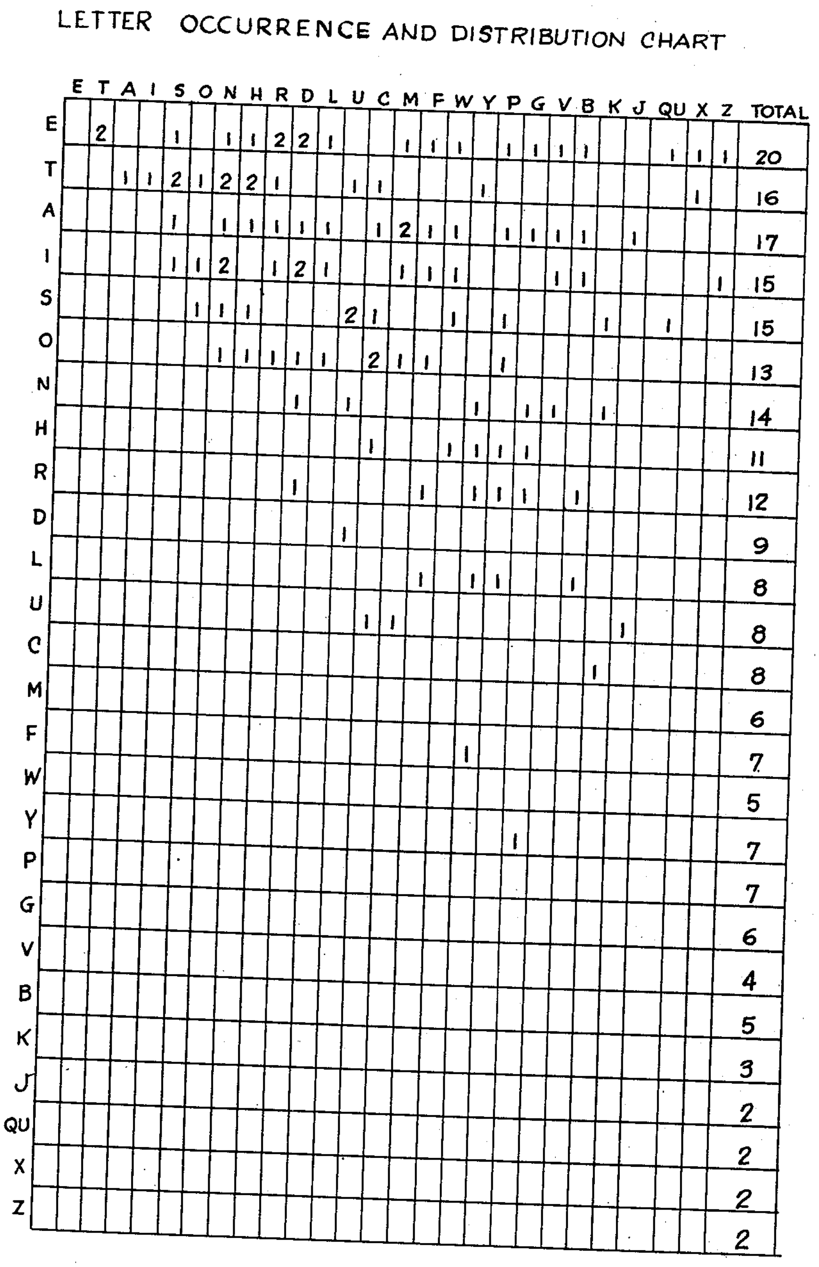
Figure 4 is a chart illustrating the relative number of occurrences and combinations of letters appearing on the cards of a "balanced deck" as previously defined.

For as many as four players a convenient size deck contains one hundred twelve cards. The chart appearing in Figure 4 illustrates the distribution and associations or combinations of the various indicia letters employed on these cards. This chart is based on usage studies with the objective of providing cards having combinations of indicia letters which have the most frequent usage in the language and of providing the optimum proportionality in the number of occurrences of individual letters relative to the other letters, so that there will be a minimum chance of frustrating the play due to an excess of certain card letters and an insufficient number of other card letters required for making up common usage words. The column at the right of the chart indicates the number of appearances of the individual indicia letters listed in the column at the left of the chart. The squares formed by the intersection of vertical and horizontal grid lines on the chart are provided so as to indicate in particular squares the number of times a particular indicia letter listed at the left of the chart appears in combination with indicia letters arranged above the columns of squares at the top of the chart. For example, in accordance with the chart there are two cards bearing the letters E and T and one card bearing the letters O and R. There are no cards on which the indicia letters QU and Z appear together.

As mentioned above, the two indicia letters of each card appear in the upper left-hand corner and lower right-hand corner, and with the card's nominal top at the top the sequence of indicia letters in the upper left-hand corner is the most commonly occurring sequence of those two indicia letters. As previously noted, the first letter of the sequence occurring in the upper left-hand corner of the card is separately presented in the upper right-hand corner of the card, and the same is true with respect to the first letter in the readable sequence occurring at the lower right-hand corner, such letter being presented separately in the lower left-hand corner of the card. In booking words one or both of the indicia letters may be used, and the sequence of the two may be read reversely, of course, by inverting the card. In word endings, where only one indicia letter of the card is used, the card should be shifted so that the separately appearing indicia letter is used in order to indicate the word ending with a single letter.

For convenience the vowels are printed in one color, such as red and the consonants are printed in a contrasting color such as black. Only the regular vowels, *a. e. i. o, u,* are considered as vowels for that purpose.

A player is allowed but one contract word during the play of one hand. The formation of such word may be started by the player at any time, in his turn, by announcing the word and by booking not less than the first three letters of the word. Contract words contribute more heavily to a player's score than "optional words."

An optional word may be started by a player at any time, in his turn, by booking not less than the first three letters of that word. The procedure is the same as for a contract word with the exception that the player's intention to form a particular optional word need not be announced when the booking of the word is started by laying down the cards. In fact, the player may change his mind and complete a different optional word than the one on which the booking was originally based. Once the booking of a contract or optional word commences, however, the card laid down may not be returned to the hand, nor the original sequence of the partially booked cards changed. No limitation is placed on the number of optional words attempted or completed by a player during the course of a hand.

The booking of words is accomplished by laying down the cards in serial relationship with only the desired indicia letters of the overlapping cards exposed to view, which are to make up the particular word. Thus if the lower indicia letter of the two appearing in the upper left-hand corner of a booked card is not to be used in the word, it should be concealed by the succeeding card overlapping it. In word endings, as mentioned above, where only one of the two indicia letters of the last card is to be used, the card should be shifted at an angle and the separately appearing indicia letter then in the upper right-hand corner aligned with the serially arranged letters of the preceding cards in the book. Where both indicia letters of the word-ending card are to be used, a special scoring premium is given, as later explained.

In order to commence the play, the deck of cards is shuffled and the cards are dealt around the table clockwise until each player has ten cards. The dealer then places the remainder of the deck in the center of the table face down. The dealer then turns up four cards from the bottom of the deck, placing these cards, face up, at respective locations adjacent the four sides of the downturned deck. From these four cards the players, in turn, select the cards which they will draw to their hands. In preparing for the play, each player ordinarily arranges the ten cards in his hand so that the nominal tops of the cards are at the top of the hand and the player is thereby assured that he is viewing the two indicia letters of each card in their most commonly occurrent sequence, from which he may more readily visualize possible words to be made up from such cards.

Following the deal, the first player at the left of the dealer commences the play by drawing one of the four cards lying face up on the table. With eleven cards now in his hand the first player may commence booking the word or words (contract or optional) he selects. Such player need not commence booking a word on the table during any particular turn of play unless he so desires, however. Sometimes it is an advantage to accumulate several additional cards before commencing booking in order to increase the word-making possibilities. In order to indicate that the player has completed his turn he draws a card from the top of the deck and places it face up on the table in the location from which he drew the card when his turn commenced. This is the signal for the next player on his left to draw one of the four upturned cards and commence to play. Play thus progresses, each player in turn drawing one of the four upturned cards and replacing it at the end of his turn by the top card from the deck. As many cards may be used in booking words as desired. However, if any player succeeds in eliminating all cards from his hand, the hand of play is thereby ended and all uncompleted books and all cards count against the other players holding them in the scoring. Otherwise the game ends when the deck cards and upwardly facing cards are all drawn and no further plays are possible by any player.

In the scoring, optional words booked by a player provide a score equal to the square of the number of letters making up the particular word. Thus a ten-letter word provides a score of one hundred. The score for completing a contract word is calculated in the same manner as an optional word except it is double the score of an optional word having the same number of letters. Thus a twelve-letter contract word provides a score of 288. In addition, if a player succeeds in utilizing both indicia letters of any word-ending card, an additional fifty points for each such word-ending card so used is added to the score. In case both letters of the I—O card are used in any completed word, an additional score of 100 over and above the word score itself is counted. In case the player is successful in using any indicia letter of any card bearing the letter J or the letter K or the letter-group QU, an additional fifty points is added to the score merely for each such usage.

After a player has tallied all of the points in his favor as above, he must subtract from the total, before entering his score, a number of points calculated by squaring the number of cards remaining unplayed in the hand together with those lying in uncompleted word books. Thus if four cards are left in the hand and eight cards lie in uncompleted word books, the number of points to be deducted from the player's score is 144.

In addition, any player who has detected the misspelling of a work by the opponent may, at the time the scores are being tabulated, suggest the correct spelling and appropriate the score for that particular word to himself.

The above rules and principles of play comprise the preferred method of utilizing the novel playing cards and offer a highly intriguing and educational vocabulary game. Obviously, variations in such rules and some variations in the make-up of the cards and also of the deck of cards in terms of the indicia letters and combinations of indicia letters used thereon as represented by the chart in Figure 4 may be used without departing from the underlying principles of the invention.

I claim as my invention:

1. A deck of playing cards for use in a vocabulary game, said deck of cards comprising a plurality of generally rectangular individual cards each having a normally upper edge and lower edge and two indicia letters

| | E | T | A | I | S | O | N | H | R | D | L | U | C | M | F | W | Y | P | G | V | B | K | J | QU | X | Z |
|---|---|---|---|---|---|---|---|---|---|---|---|---|---|---|---|---|---|---|---|---|---|---|---|---|---|---|
| E | | 2 | | | 1 | | 1 | 1 | 2 | 2 | 1 | | | 1 | 1 | 1 | | 1 | 1 | 1 | 1 | | | 1 | 1 | 1 |
| T | | | 1 | 1 | 2 | 1 | 2 | 2 | 1 | | | 1 | 1 | | | | 1 | | | | | | | | 1 | |
| A | | | | | 1 | | 1 | 1 | 1 | 1 | 1 | | 1 | 2 | 1 | 1 | | 1 | 1 | 1 | 1 | | 1 | | | |
| I | | | | | 1 | 1 | 2 | | 1 | 2 | 1 | | | 1 | 1 | 1 | | | | 1 | 1 | | | | | 1 |
| S | | | | | | 1 | 1 | 1 | | | | 2 | 1 | | | 1 | | 1 | | | | 1 | | 1 | | |
| O | | | | | | | 1 | 1 | 1 | 1 | 1 | | 2 | 1 | 1 | | | 1 | | | | | | | | |
| N | | | | | | | | | | 1 | | 1 | | | | | 1 | | 1 | 1 | | 1 | | | | |
| H | | | | | | | | | | | | | 1 | | | 1 | 1 | 1 | 1 | | | | | | | |
| R | | | | | | | | | | 1 | | | | | 1 | | 1 | 1 | 1 | | 1 | | | | | |
| D | | | | | | | | | | | | 1 | | | | | | | | | | | | | | |
| L | | | | | | | | | | | | | | | 1 | | 1 | 1 | | | 1 | | | | | |
| U | | | | | | | | | | | | | 1 | 1 | | | | | | | | | 1 | | | |
| C | | | | | | | | | | | | | | | | | | | | | | 1 | | | | |
| M | | | | | | | | | | | | | | | | | | | | | | | | | | |
| F | | | | | | | | | | | | | | | | | 1 | | | | | | | | | |
| W | | | | | | | | | | | | | | | | | | | | | | | | | | |
| Y | | | | | | | | | | | | | | | | | | | 1 | | | | | | | |

thereon, the indicia letters being different on the different cards, said two indicia letters of a card appearing in closely spaced readable sequence in the upper left hand corner of said card and in closely spaced but relatively reverse readable sequence in the lower right hand corner of said card, with the latter appearance of said indicia letters being readable with the card inverted from its normal position, one of said two indicia letters also appearing alone in the upper right hand corner of said card and the other of said two indicia letters also appearing alone in the lower left hand corner of said card, whereby selected words are formed by the cards arranged in successively overlapped series relationship to expose one or both indicia letters in one corner of each card in accordance with the amount of overlap thereof by the next overlying card in the series, the last and uppermost card in said series being arranged, at least in some word endings, with one of its lone appearing indicia letters aligned with the exposed word-forming indicia letters of the other cards in the series, and whereby a hand of such cards may be held and viewed in successively overlapped fan-like arrangement with the two indicia letters of each card exposed to view.

2. The deck of playing cards defined in claim 1, wherein the two indicia letters occur in the deck approximately proportionally to the occurrences thereof represented in the following chart:

said two indicia letters of each card appearing twice on said card, namely in one closely spaced readable sequence at one extremity of such card and in the opposite closely spaced readable sequence at an opposite extremity of such card with the card inverted.

3. The deck of playing cards defined in claim 1, wherein the indicia letters in the upper left and lower right corners of the cards are arranged one above the other.

4. The deck of playing cards defined in claim 3, wherein the lone appearing indicia letters in the upper right and lower left corners of the cards are oriented differently on the card than the two indicia letters appearing together on the card.

5. The deck of playing cards defined in claim 1, wherein the lone appearing indicia letters in the upper right and lower left corners of the cards are oriented differently on the card than the two indicia letters appearing together on the card.

References Cited in the file of this patent

UNITED STATES PATENTS

| | | |
|---|---|---|
| 742,498 | Roy | Oct. 27, 1903 |
| 1,320,628 | Lowman | Nov. 4, 1919 |
| 2,265,334 | Armbruster | Dec. 9, 1941 |
| 2,457,020 | Whitney | Dec. 21, 1948 |